No. 730,144. PATENTED JUNE 2, 1903.
J. J. McCOURT.
AUTOMATIC STOCK WATERING APPARATUS.
APPLICATION FILED FEB. 24, 1903.
NO MODEL.

Witnesses
E. K. Reichenbach
J. R. Wilson

Inventor
John J. McCourt
By H. R. Wilson
Attorney

No. 730,144.

Patented June 2, 1903.

UNITED STATES PATENT OFFICE.

JOHN J. McCOURT, OF OAKLAND, NEBRASKA.

AUTOMATIC STOCK-WATERING APPARATUS.

SPECIFICATION forming part of Letters Patent No. 730,144, dated June 2, 1903.

Application filed February 24, 1903. Serial No. 144,792. (No model.)

*To all whom it may concern:*

Be it known that I, JOHN J. MCCOURT, a citizen of the United States, residing at Oakland, in the county of Burt and State of Nebraska, have invented certain new and useful Improvements in Automatic Stock-Watering Apparatus; and I do declare the following to be a full, clear, and exact description of the invention, such as will enable others skilled in the art to which it appertains to make and use the same.

My invention relates to improvements in automatic stock-watering apparatus especially adapted for watering poultry and the smaller animals; and it consists in the peculiar construction and combination of devices hereinafter described and claimed.

Figure 1:
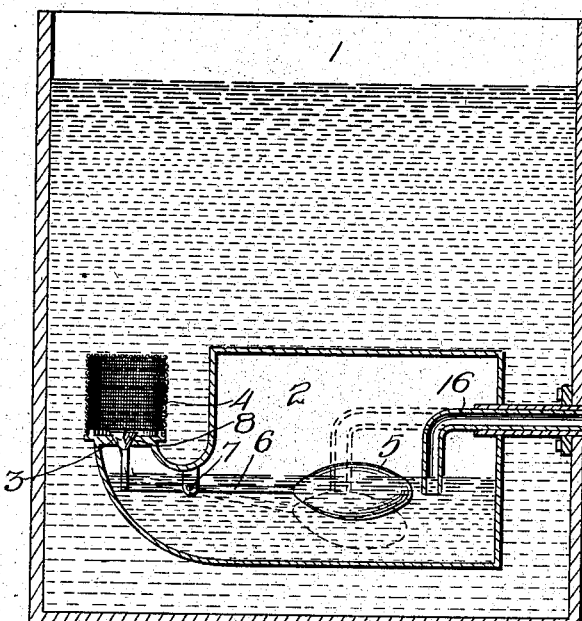
Figure 1:
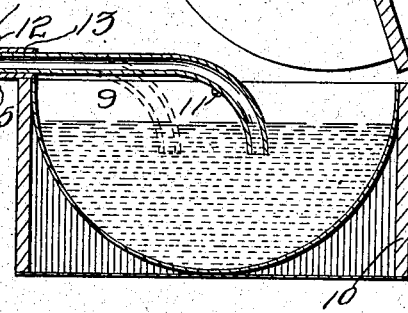
Figure 2:
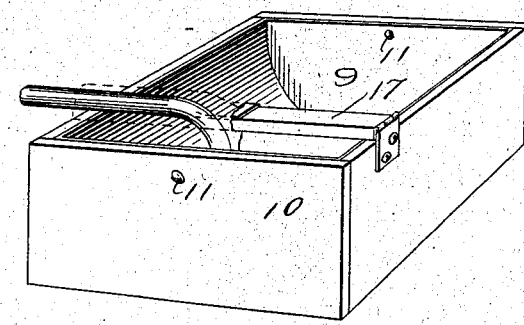
Figure 3:
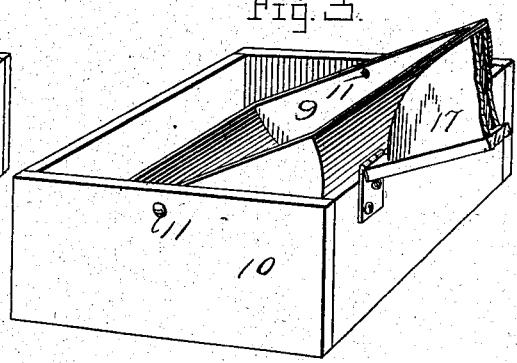

In the accompanying drawings, Figure 1 is a vertical sectional view of a stock-watering apparatus embodying my improvements. Fig. 2 is a detail perspective view of the trough. Fig. 3 is a similar view of the same, showing the trough tilted in position to discharge its contents.

In the embodiment of my invention here shown there is provided a reservoir-tank 1, which may be of any suitable construction and in which is submerged a float-chamber 2, which may be either of the form here shown or of any other suitable construction and is provided with a water-supply opening 3. The said opening is here shown as surrounded by a strainer 4. In the said chamber 2 is a float 5, which is carried by a lever 6, the latter being fulcrumed, as at 7, and connected at one end to a valve 8, which operates in the opening 3 and is adapted to close and open the same, the float rising and falling with the water-level in the float-chamber, as will be understood. On one side of the reservoir-tank is a drinking-trough 9, which is disposed in a suitable casing 10 and is pivoted at its ends, as at 11, so that the said trough is adapted to be inclined by turning it on its pivotal supports to discharge its contents.

In one side of the reservoir-tank is an opening 12, through which extends a tubular sleeve 13, the same being securely clamped to one side of the reservoir-tank by means of plates or other suitable devices 14, which are here shown as provided with clamping-bolts 15. The inner end of the said tubular sleeve extends into the float-chamber through an opening in one side thereof. In the tubular sleeve 13 and fitting snugly therein is a siphon or discharge pipe 16, which is adapted to be turned in the said tubular sleeve and also to be moved longitudinally therein. The inner end of the said siphon or discharge pipe is adapted to be downturned, so that its lower end will be submerged in the water in the float-chamber, and the outer end of the said discharge-pipe is adapted to be similarly disposed in the drinking-trough 9. The construction of the float 5 and the intake end of the siphon or discharge pipe and their relation are such that when the siphon or discharge pipe is moved outwardly, as shown in full lines in Fig. 1, the float is adapted to operate, and when the siphon-pipe is moved inwardly, as shown in dotted lines in Fig. 1, its intake end rides over the float and depresses the latter, hence causing the valve 8 to be opened. I also provide a cover 17 for that portion of the siphon or discharge pipe which is disposed above the drinking-trough, said cover being pivoted at one side to the casing 10, in which the drinking-trough is disposed, and being adapted thereby to be lowered to cover the outer end of the siphon or discharge pipe and also to be raised to uncover the same.

The operation of my invention is as follows: Assuming the drinking-trough to be empty and no water to be flowing thereto, the siphon or discharge pipe is moved inwardly to the position shown in dotted lines in Fig. 1, thereby causing the valve 8 to open and water to enter the float-chamber through the opening 3 from the reservoir-tank and to flow through the siphon or discharge pipe 16 to the watering trough. As soon as the flow commences said pipe 16 is drawn outwardly to the position shown in full lines in said Fig. 1, and thereafter the float and valve operate automatically in connection with the siphon or discharge pipe to supply water to the trough as fast as the same is consumed therein, as will be understood. To discontinue the operation of the apparatus, the siphon or discharge pipe 16 may be partly turned to raise its intake and discharge ends out of the water in the float-chamber and drinking-trough, and this also enables said siphon or discharge pipe to be drained to prevent water from freezing therein in cold weather. The cover 17 prevents the siphon or discharge pipe from being disturbed or broken by the animals, as will be understood.

I do not desire to limit myself to the precise construction and combination of devices herein shown and described, as it is evident that modifications may be made therein without departing from the spirit of my invention and within the scope of the appended claims.

Having thus fully described my invention, what I claim as new, and desire to secure by Letters Patent, is—

1. In apparatus of the class described, the combination of a reservoir, a float-chamber having valved communication therewith, a float in said chamber to operate said valve, and a siphon-pipe leading from said chamber, said siphon-pipe being adapted to coact with the float to maintain the valve in an open position to establish siphonic action in said pipe, substantially as described.

2. In apparatus of the class described, the combination of a reservoir, a float-chamber having valved communication therewith, a float in said chamber to operate said valve, and a siphon-pipe leading from said float-chamber, said siphon-pipe being longitudinally movable and adapted to coact with the float to maintain the valve initially in an open position, substantially as described.

3. In apparatus of the class described, the combination of a reservoir, a float-chamber having valved communication therewith, a float in said chamber to operate said valve, and a siphon-pipe leading from said float-chamber, said siphon-pipe being longitudinally movable and also adapted to be turned to raise and lower its intake and discharge ends, substantially as described.

4. An apparatus of the class described, comprising a reservoir-tank and float-chamber, a valve to establish communication between the latter and the reservoir-tank, a float connected to the valve to automatically operate the same, said float being disposed in the float-chamber, a sleeve extending through one side of the reservoir-tank, a siphon-pipe longitudinally movable in said sleeve and also adapted for rotation therein and having an intake end adapted to be submerged in the water in the float-chamber, and a drinking vessel into which said siphon-pipe discharges, substantially as described.

5. In apparatus of the class described, a casing, a pivoted trough carried thereby, a water-supply apparatus having a spout discharging into the trough, and a cover connected to the casing and adapted to house said spout, substantially as described.

6. In apparatus of the class described, the combination of a valved float-chamber, a source of water, a float in said chamber adapted to automatically operate said valve, and a discharge-conduit adapted for coaction with the valve to maintain the latter in an open position, substantially as described.

In testimony whereof I have hereunto set my hand in presence of two subscribing witnesses.

JOHN J. McCOURT.

Witnesses:
 VICTOR L. FRIED,
 IRA THOMAS.